United States Patent
Foltin

(10) Patent No.: US 10,513,201 B2
(45) Date of Patent: Dec. 24, 2019

(54) METHOD AND DEVICE FOR ADAPTING A SEATING POSITION OF AN OCCUPANT OF A VEHICLE

(71) Applicant: Robert Bosch GmbH, Stuttgart (DE)

(72) Inventor: Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 15/944,145

(22) Filed: Apr. 3, 2018

(65) Prior Publication Data
US 2018/0304775 A1    Oct. 25, 2018

(30) Foreign Application Priority Data

Apr. 20, 2017   (DE) .......................... 10 2017 206 629

(51) Int. Cl.
*B60N 2/02* (2006.01)
*B60N 2/22* (2006.01)
*B60R 21/0134* (2006.01)
*B60R 21/00* (2006.01)
*B60R 21/01* (2006.01)

(52) U.S. Cl.
CPC ............ *B60N 2/0276* (2013.01); *B60N 2/22* (2013.01); *B60R 21/0134* (2013.01); *B60R 2021/0004* (2013.01); *B60R 2021/01013* (2013.01)

(58) Field of Classification Search
CPC combination set(s) only.
See application file for complete search history.

(56) References Cited

U.S. PATENT DOCUMENTS

| 4,634,169 A * | 1/1987 | Hasstedt ............ B60N 2/42736 296/68.1 |
| 6,227,563 B1 * | 5/2001 | Talisman ............... B60N 2/002 280/735 |
| 2010/0324774 A1 * | 12/2010 | Bouni ................. B60R 21/0152 701/31.4 |

\* cited by examiner

*Primary Examiner* — Abby Y Lin
*Assistant Examiner* — Renee LaRose
(74) *Attorney, Agent, or Firm* — Norton Rose Fulbright US LLP; Gerard Messina

(57) ABSTRACT

A method for adapting a seating position of an occupant of a vehicle in a collision of the vehicle 100 with a foreign object. The method includes a step of providing an adjustment signal, which causes a change in the seating position from an upright position to a lying position, to an interface to a seat device of the vehicle using a collision signal that indicates an imminent underride situation of the vehicle, and using a position signal that indicates a seating position of the occupant, and the provision takes place if the position signal indicates the upright position, and the provision does not take place if the position signal 108 indicates the lying position.

12 Claims, 7 Drawing Sheets

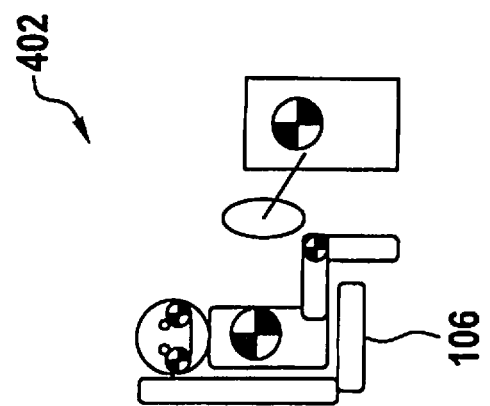
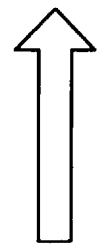
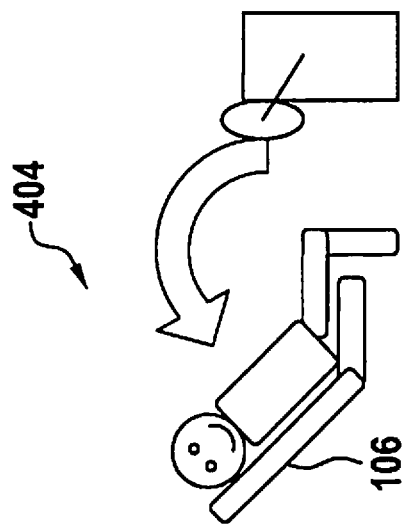
Fig. 4

METHOD AND DEVICE FOR ADAPTING A SEATING POSITION OF AN OCCUPANT OF A VEHICLE

CROSS REFERENCE

The present application claims the benefit under 35 U.S.C. § 119 of German Patent Application No. DE 102017206629.6 filed on Apr. 20, 2017, which is expressly incorporated herein by reference in its entirety.

BACKGROUND INFORMATION

The present invention relates to a device and a method for adapting a seating position of an occupant of a vehicle. The present invention also relates to a computer program.

Vehicles are equipped with seat devices, which are able to be adjusted electrically or manually.

SUMMARY

In accordance with the present invention, a method is provided for adapting a seating position of an occupant of a vehicle; a device that uses this method is also provided. Finally, a corresponding computer program is provided. Advantageous developments and improvements of the device and method are described herein.

For example, a driver who is in a lying position in a vehicle that is driven in a highly automated manner may remain in the lying position in the event of an underride accident of the vehicle, thereby making it possible to minimize the injury risk.

A method is introduced for adapting a seating position of an occupant of a vehicle in the event of a collision of the vehicle with a foreign object, the method including the following step:

Providing an adjustment signal to an interface to a seating device of the vehicle, which causes a change in the seating position from an upright position to a lying position, using a collision signal that indicates an impending underride situation of the vehicle, and using a position signal that indicates the seating position of the occupant. The provision takes place when the position signal indicates the upright position, and the provision does not take place if the position signal indicates the lying position.

The vehicle may be a passenger transport vehicle, e.g., a vehicle driving in a highly automated manner, and the occupant may be a driver or a passenger of the vehicle, for instance. In general, the described approach is also relevant for further occupants or passengers, especially when serious accidents are involved in which the front row is completely destroyed, e.g., due to the penetration of an engine, etc., whereas the rear seat row is able to be protected by a shift to a lying position. A collision may involve an underride accident. A foreign object could be a truck or a large wild animal, for instance. The adjustment signal may include information about a preferred modification of the seating position of the occupant. Using the adjustment signal, for example, an electrically controlled seat adjustment is able to be actuated. A collision signal may indicate information about an impending accident situation, especially an underride situation, and the collision signal may be made available by a suitable collision-detection device of the vehicle. According to one specific embodiment, data from at least one environment sensor of the vehicle are used to determine the collision signal so that the accident situation is already detectable at an early stage, i.e., even before the collision occurs. A seat device may be understood to describe an adjustable seat and/or a bench-type seat in the vehicle. In the upright position, the occupant may be seated on the seat device in an erect position, and in the lying position, the occupant may lie on the seat device. The position signal, for example, could indicate a position of different seat elements in relation to one another, in particular an angular position of a seat backrest of the seat device. In the same way, the position signal is able to indicate the inclination of the seat cushion. The adjustment of a seat element may be linked with the movement of another seat element. The approach is not restricted to the seat backrest; instead, the control of the seat-cushion inclination, a height adjustment as well as a distance adjustment (longitudinal) are able to be realized. In the case of rotatable seats, it is also possible to specify a rotary position because the backrest inclination, in particular, is restricted depending on the rotary position. For example, if the seat is rotated toward the interior, then it will be impossible to lean back because the door is located there.

According to one specific embodiment, in the step of determining, the collision signal is able to be determined using an environment signal that is received via an interface to an environment sensor of the vehicle. An environment sensor such as a camera, advantageously detects a looming underride situation that involves a truck or a large wild animal.

According to one specific embodiment, in the step of providing, the present method is able to provide the adjustment signal using an overlap signal. The overlap signal may indicate an overlap between the vehicle and the foreign object. In this case, it may preferably be indicated up to which degree and at what point the vehicle and the foreign object will overlap, and the adjustment signal is supplied if at least one side of the vehicle and its occupant are at risk.

According to one specific embodiment, in the step of providing, the present method is able to provide the adjustment signal using a risk signal. The risk signal may indicate a first injury risk for the occupant in the collision in the upright position and, additionally or alternatively, it may indicate a second injury risk for the occupant in the collision in the lying position. When evaluating the injury risk in a collision of the vehicle with a foreign object, it is advantageously considered in which seating position the occupant of the vehicle is most optimally protected. Only a single injury risk is thus examined according to one specific embodiment, preferably the injury risk of the sitting position. If the injury risk exceeds a threshold, then the lying position will be adjusted. Additionally or alternatively, it is possible to implement the lying position if a risk threshold is undershot in the lying position.

According to one specific embodiment, it is possible to evaluate the injury risk for a seated position and a lying position in the unbelted state.

According to one specific embodiment, in the step of providing, the adjustment signal may be provided using a foreign-object signal, the foreign-object signal indicating whether the foreign object is a passenger car or some other object. The adjustment signal may be supplied if the foreign-object signal indicates the other object, and the provision of the adjustment signal may be omitted if the foreign-object signal identifies the passenger car as the foreign object. In this specific embodiment, too, it is considered which seating position best protects the occupant of the vehicle in the event of an underride situation.

According to one specific embodiment, in the step of providing, the present method is able to provide the adjustment signal with the aid of a belt signal, the belt signal indicating whether the occupant is strapped in. The adjustment signal may be provided if the belt signal indicates that the occupant is strapped in, thereby making it possible to couple the occupant to the seat, e.g., with the aid of a belt pretensioner, and to prevent a possible sliding out from underneath the belt. In the method step, it is advantageously considered whether the lying position is safer than adjusting the seat device to an upright position with a forward displacement if the occupant has failed to put on a seatbelt. The safer position is preferably triggered.

In the step of providing, the adjustment signal may be provided using a risk signal that indicates an expected penetration depth of the vehicle. For example, this may involve the penetration depth underneath a truck. If the penetration depth is high, the lying position may be advantageous. At a low penetration depth, on the other hand, i.e., a penetration depth that falls below a threshold, e.g., such as the engine hood, the sitting position may be advantageous. In this context, large wild animals may be counted as a deep penetration depth, and it is also possible to use a velocity-dependent penetration depth in this context. In other words, it is taken into account how far the animal will slide on the engine hood.

According to one specific embodiment, in the step of providing, the present method may provide the adjustment signal using a control signal, which indicates whether the vehicle is under manual or automated control. The adjustment signal may also be supplied if the control signal indicates that the vehicle is being manually controlled. A predictive environment sensor, which detects a looming accident, is advantageously mounted on the vehicle, and the driver is then brought into a lying position with the aid of the electrical seat-adjustment system.

According to one specific embodiment, the present method is able to modify the upright position to the lying position using a step of releasing a mechanical anchoring of the seat device and using the adjustment signal. The release of the mechanical anchoring is advantageously triggered in a pyrotechnic manner, whereby even manually adjustable seat devices are able to be brought into a lying position.

According to one specific embodiment, in the step of providing, the present method is able to provide the adjustment signal using a protection signal, which indicates whether the seat device is equipped with a restraining system that prevents submarining of the occupant. For example, the adjustment signal may be made available if the protection signal indicates an availability of the restraining system. A restraining system may be an anti-submarining airbag or a belt pretensioner, for example. If these restraining systems are not available, the lying position will advantageously not be adjusted.

According to one specific embodiment, in the step of providing, the present method may furthermore provide the adjustment signal using a seat-occupancy signal that indicates a seat occupancy inside the vehicle. If the vehicle is fully occupied, then it is advantageously considered whether a lying position of an occupant is feasible if other occupants could be put at risk in the process.

This method may be implemented in software or hardware in a control unit or in a mixed form of hardware and software, for instance.

The approach introduced here furthermore provides a device, which is designed to execute, actuate or carry out the steps of a variant of a method introduced here in corresponding devices. This variant of a development of the present invention in the form of a device also makes it possible to rapidly and efficiently achieve the objective that forms the basis of the present invention.

For this purpose, the device may include at least one processing unit for processing signals or data, at least one memory unit for storing signals or data, at least one interface to a sensor or to an actuator for reading in sensor signals from the sensor or for outputting data or control signals to the actuator, and/or at least one communications interface for reading in or outputting data, which are embedded in a communications protocol. For example, the processing unit may be a signal processor, a microcontroller or the like, and the memory unit may be a flash memory, an EEPROM, or a magnetic memory unit. The communications interface may be developed to read in or output data in a wireless and/or a line-bound manner. A communications interface that is able to read in or output line-bound data may read in these data, e.g., electrically or optically, from a corresponding data-transmission line or output these data to a corresponding data-transmission line.

In this instance, a device is to be understood as an electrical device which processes sensor signals and outputs control and/or data signals as a function thereof. The device may have an interface that could be developed in hardware and/or in software. In the case of a hardware development, the interfaces can be part of what is called a system ASIC, for instance, which includes a wide variety of different functions of the device. However, it is also possible that the interfaces are discrete integrated switching circuits or are at least partially made up of discrete components. In the case of a software development, the interfaces may be software modules, which are provided on a microcontroller in addition to other software modules.

Also advantageous is a computer program product or a computer program having program code, which may be stored on a machine-readable carrier or a storage medium such as a semiconductor memory, a hard disk memory, or an optical memory and which is used for executing, implementing and/or actuating the steps of the present method according to one of the afore-described specific embodiments, in particular when the program product or program is executed on a computer or a device.

Exemplary embodiments of the present invention are illustrated in the figures and described in greater detail below.

BRIEF DESCRIPTION OF THE DRAWINGS

FIG. 4 shows a schematized illustration of a seating device in an upright position and in a lying position.

DETAILED DESCRIPTION OF EXAMPLE EMBODIMENTS

Figure 1:
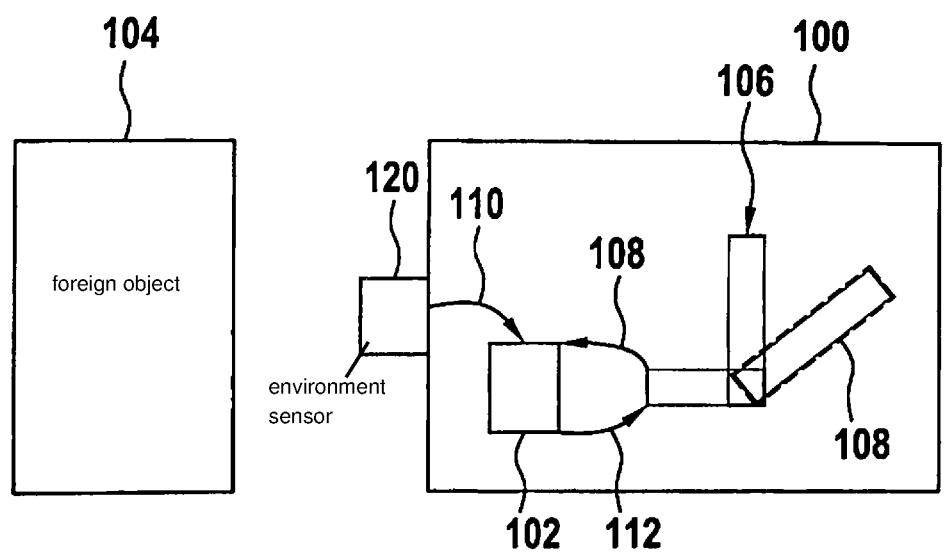
FIG. 1 shows a schematized illustration of a vehicle according to one exemplary embodiment.

In the description below of advantageous exemplary embodiments of the present invention, identical or similar reference numerals are used for the elements that are shown in the various figures and exhibit a similar effect, and a repeated description of these elements has been omitted.

FIG. 1 shows a schematic representation of a vehicle 100 having a device 102 for adapting a seating position of an occupant of vehicle 100 according to one exemplary embodiment. Vehicle 100 is driving on a road and is facing an imminent underride accident with a foreign object 104. In this particular exemplary embodiment, foreign object 104 is a truck. At least one seat device 106 is installed in vehicle 100, its backrest 108 being lockable in at least two positions. For the best possible protection of an occupant in the imminent underride accident, the seating position of the passenger is able to be modified.

Device 102 is developed to provide an adjustment signal 112 that allows for a change in the seating position of the occupant. Device 102 is developed to receive a position signal 108 and a collision signal 110 and to determine adjustment signal 112 using position signal 108 and collision signal 110.

Collision signal 110 includes information pertaining to the looming underride situation of vehicle 100; for example, collision signal 110 indicates the imminent collision with foreign object 104. Position signal 108 shows the current seating position of the occupant on seat device 106. Position signal 108 particularly indicates whether the occupant is in an upright position or in a lying position.

With the aid of adjustment signal 112, seat device 106 may be controlled such that backrest 108 of seat device 106 is brought from the upright position to the lying position, for instance. Toward this end, an actuator of seat device 106 is controlled in such a way that backrest 108 is adjusted.

Adjustment signal 112, which causes a change in the seating position from the upright position to the lying position, is made available whenever collision signal 110 indicates the underride situation and position signal 108 indicates the upright position of seat device 106. However, no adjustment signal 112 for changing the seating position to the lying position is output when position signal 108 indicates a current lying position of seat device 106.

According to one exemplary embodiment, at least one environment sensor 120 is disposed on vehicle 100. Environment sensor 120 is developed to detect the environment of vehicle 100. According to this exemplary embodiment, foreign object 104 is located in a detection range of environment sensor 120. According to this exemplary embodiment, environment sensor 120 is developed to determine collision signal 110 that indicates the imminent collision with foreign object 104 from the detected environment data and to make it available to an interface to device 102. As an alternative, collision signal 110 is determined in a suitable device using data from a plurality of environment sensors 120 and is made available to device 102.

Figure 2:
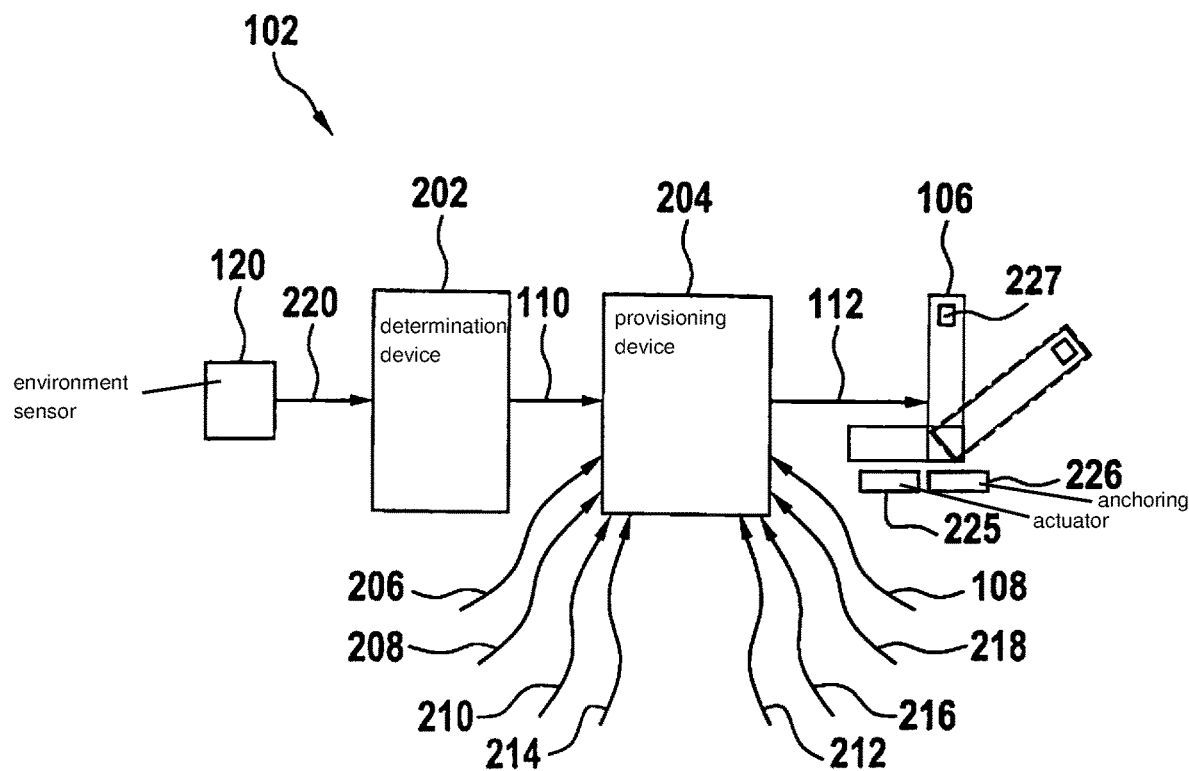
FIG. 2 shows a schematized illustration of a device for adapting a seating position of an occupant of the vehicle according to one exemplary embodiment.

FIG. 2 shows a schematic illustration of a device 102 for adapting a seating position of an occupant of a vehicle according to one exemplary embodiment. Device 102 is device 102 described with the aid of FIG. 1, for instance.

Device 102 includes a provisioning device 204. Provisioning device 204 is developed to receive position signal 108 and collision signal 110 and to determine adjustment signal 112 based on position signal 108 and collision signal 110, and to make it available to an interface to seat device 106.

According to one exemplary embodiment, device 102 furthermore includes a determination device 202. Determination device 202 is developed to determine collision signal 110, e.g., using sensor data, and to transmit it to an interface to provisioning device 204.

In addition, FIG. 2 shows environment sensor 120. Environment sensor 120 is developed to detect the environment of the vehicle. Moreover, environment sensor 120 is designed to transmit an environment signal 220, which represents the detected environment, to an interface to determination device 202. According to one exemplary embodiment, determination device 202 is designed to determine collision signal 110 utilizing environment signal 220 as a minimum.

In addition, seat device 106 is shown in FIG. 2. According to one exemplary embodiment, seat device 106 includes an actuator 225 such as an electric motor, which is designed to adjust a seat of seat device 106 with the aid of adjustment signal 112. For instance, actuator 225 is developed to adjust a backrest of seat device 106.

In addition or as an alternative, seat device 106 includes a mechanical anchoring 226 via which a seat of seat device 106 is able to be fastened to the vehicle body. According to the exemplary embodiment illustrated, anchoring 226 is not directly mounted on the vehicle body; instead, anchoring 226 may be understood to describe a type of seat frame on which the backrest and/or the seat cushion of seat device 106 is/are then fixed in place and can be disconnected prior to the collision. According to one exemplary embodiment, mechanical anchoring 226 is disconnected with the aid of adjustment signal 112 for the purpose of adjusting the upright position to the lying position.

According to one exemplary embodiment, provisioning device 204 is designed to receive an overlap signal 206 and to use it to provide adjustment signal 112 to seat device 106. Overlap signal 206 provides information regarding a possible overlap between vehicle 100 and foreign object 104. Overlap signal 206 is supplied by determination device 202, for example, using environment signal 120.

According to one exemplary embodiment, provisioning device 204 is developed to receive a risk signal 208 and to use it to provide adjustment signal 112 to seat device 106. Risk signal 208 indicates a risk of injury for the occupant in a collision in the upright position, and a second risk of injury to the occupant in the collision in the lying position. For example, risk signal 208 is made available by determination device 202 using environment signal 120 and stored risk data.

According to one exemplary embodiment, provisioning device 204 is designed to receive a foreign-object signal 210 and to use it to supply adjustment signal 112 to seat device 106. Foreign-object signal 210 indicates whether the foreign object is a passenger car or some other object, e.g., a truck. Adjustment signal 112 is made available if foreign-object signal 210 indicates an object that is not a passenger car. Adjustment signal 112 is not supplied if foreign-object signal 210 indicates the passenger car as foreign object 104. Foreign-object signal 210, for example, is supplied by determination device 202 with the aid of environment signal 120. To do so, for example, determination device 202 is developed to carry out an object identification using environment signal 220, which determines the type of the foreign object with which the vehicle will likely collide.

According to one exemplary embodiment, provisioning device 204 is developed to receive a belt signal 212 and to use it to provide adjustment signal 112 to seat device 106. Belt signal 212 indicates whether the occupant is wearing a seatbelt. Adjustment signal 112 is provided if belt signal 212 indicates that the occupant is strapped in. For example, foreign-object signal 210 is made available by seat device 106.

According to one exemplary embodiment, provisioning device 204 is designed to receive a control signal 214 and to use it to provide adjustment signal 112 to a seat device. The control signal indicates whether the vehicle is controlled in a manual or automated manner. Adjustment signal 112 is provided if control signal 214 indicates that the vehicle is under manual control. Control signal 214 is provided by a device for the automated control of the vehicle, for instance.

According to one exemplary embodiment, provisioning device 204 is designed to receive a protection signal 216 and to use it to provide adjustment signal 112 to seat device 106. Protection signal 216 indicates whether seat device 106 has a restraining device 227 available to prevent sliding of the occupant. Adjustment signal 112 is provided if protection signal 216 indicates an availability of restraining device 227. Protection signal 216 is supplied by seat device 106, for instance.

According to one exemplary embodiment, provisioning device 204 is designed to receive a seat-occupancy signal 218 and to use it to provide adjustment signal 112 to seat device 106. Seat-occupancy signal 218 indicates a seat occupancy inside the vehicle. For example, seat-occupancy signal 218 is supplied by seat device 106 and by further seat devices.

Figure 3:
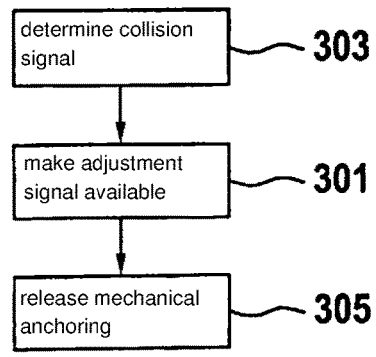
FIG. 3 shows a flow diagram of a method for adapting a seating position of an occupant of a vehicle according to one exemplary embodiment.

FIG. 3 shows a flow diagram of a method 300 for adapting a seating position of an occupant of a vehicle according to one exemplary embodiment. The present method may be carried out using the device described with the aid of FIG. 2, for instance.

Method 300 includes a step 301 in which an adjustment signal is made available. The adjustment signal is determined with the aid of a collision signal and a position signal. The adjustment signal is provided to realize a change in the seating position from an upright position to a lying position of the seat device of the vehicle. The provision of the adjustment signal takes place whenever the position signal indicates the upright position of the seat device, and the provision of the adjustment signal does not occur when the position signal indicates the lying position of the seat device.

The collision signal is determined in an optional step 303. For example, the collision signal is determined using an environment signal. The collision signal includes information pertaining to a looming underride situation of the vehicle.

In an optional step 305, using the adjustment signal, a mechanical anchoring of the seat device is released. During the release of the seat device, the upright position is changed to the lying position.

FIG. 4 shows a schematic illustration of a seat device 106 in an upright position 402 and in a lying position 404. In the left part of the illustration, an occupant of a vehicle is in lying position 404. In the event of a collision between the vehicle and a foreign object that does not involve an underride situation, the occupant of the vehicle may be moved into an upright position 402 for safety reasons.

In highly automated driving, different OEMs show that one will be traveling in a lying position 404 in order to relax during the drive. A seat device 106 of a vehicle, which hereinafter will also be denoted as seat 106, may be electrically or manually controlled and be brought to a type of lying position 404 so that the occupant is able to relax at a rest stop. Prior to an imminent accident, the occupant is positioned in such a way that a position is assumed that approximates a dummy position as closely as possible ahead of a collision, as illustrated in the right drawing. The dummy position is tested in official crash tests, and the restraining systems, e.g., belt pretensioners or anti-submarining airbags, are to be optimized such that they protect the occupants in the best manner possible. In certain accident scenarios, an occupant who is in a lying position 404 is therefore moved into an upright position 402. When the occupant is positioned horizontally in the lying position, it may happen that the occupant slips out from underneath the belt and seriously injures himself during the collision due to the strong acceleration. This sliding through is also called "submarining". So-called anti-submarining airbags are capable of preventing an occupant from sliding through the belt and under the seat. With the aid of the described approach, it is possible to provide means that prevent the submarining.

Some time ago, the Mobileye company already showed that it has the capability of classifying crossing elks. For example, passenger cars and trucks are able to be differentiated by their different dimensions, especially their different heights and/or lengths but also the width. In the same way, special illumination devices may distinguish between a passenger car and a truck, and trailers are detectable via a reflective triangle, for example.

Figure 5:
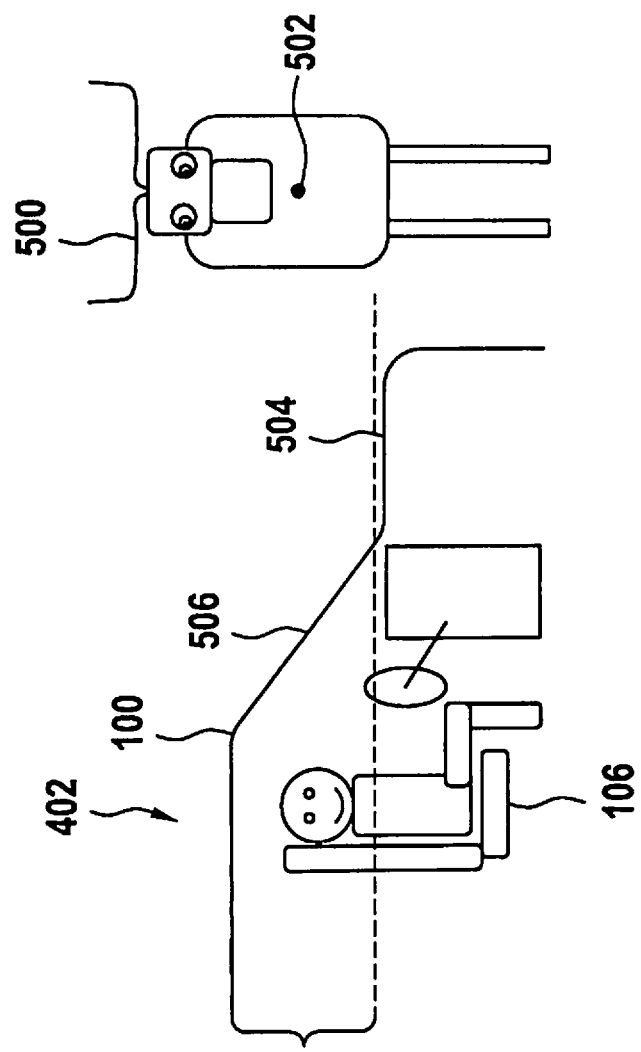
FIG. 5 shows a schematized illustration of a collision of a vehicle with an elk according to one exemplary embodiment.

FIG. 5 shows a schematized illustration of an imminent collision between a vehicle 100 and an elk 500 according to one exemplary embodiment. The illustration shows a vehicle 100 in which an occupant is seated in an upright position 402 on a seat device 106. Vehicle 100 is facing an imminent collision with an elk 500. The body center of mass 502 of elk 500 lies above engine hood 504 of vehicle 100 in this instance.

Each year, numerous road kill accidents occur on domestic roads. A large number of elks 500 are encountered especially in Scandinavian countries, and fatal accidents occur to an increasing extent. Collisions between vehicles 100 and other larger animals such as horses or cows also happen quite frequently. All of these animals have in common that they are relatively heavy, the legs of the animals are sufficiently tall, and the body's center of mass 502 of the animals lies above engine hood 504 of vehicle 100. In the event of an accident, the animals therefore strike windshield 506 of vehicle 100 virtually without any deceleration. Due to the great weight of the animals, they are capable of completely destroying the sensitive area above engine hood 504. The head of the occupant is usually located in the region of windshield 506 so that very serious injuries may result.

Figure 6:
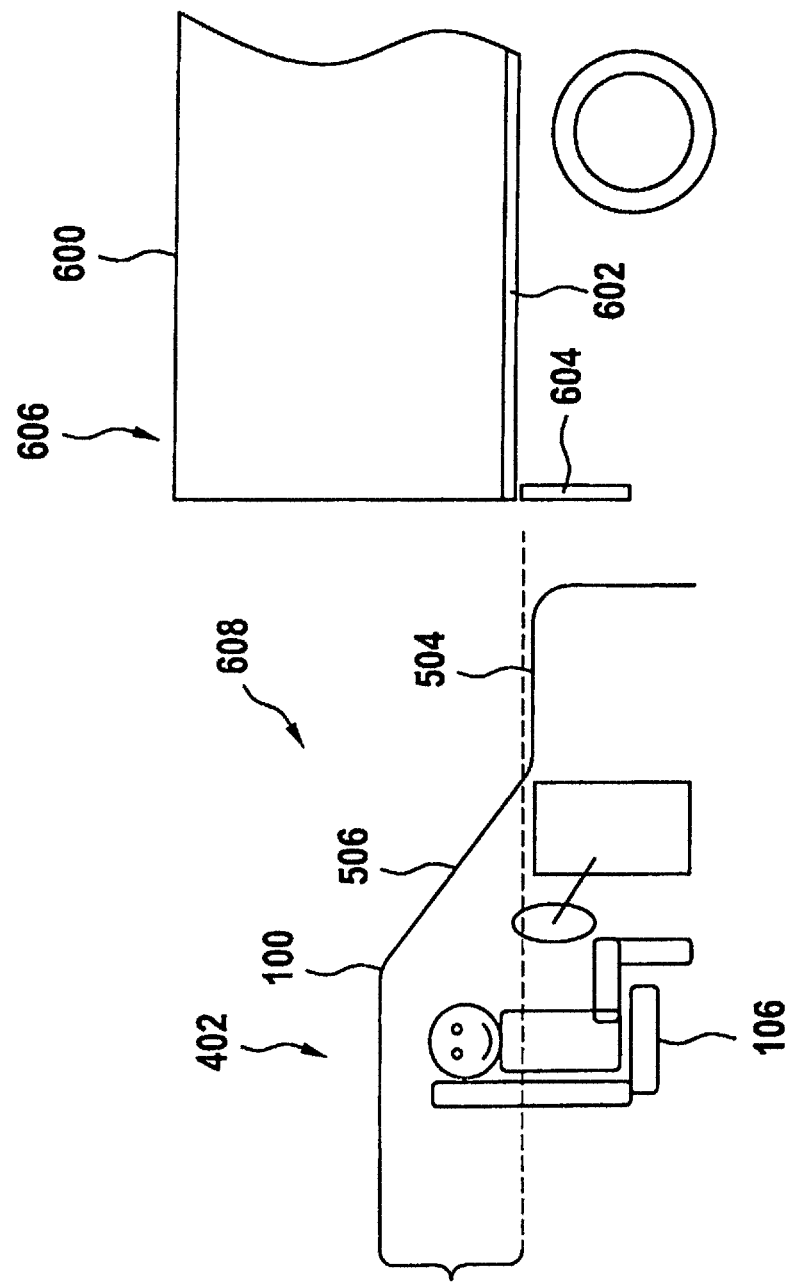
FIG. 6 shows a schematized illustration of a collision of a vehicle with a truck according to one exemplary embodiment.

FIG. 6 shows a schematized illustration of a collision of a vehicle 100 with a truck 600 according to one exemplary embodiment. The illustration shows a vehicle 100 in which an occupant sits in an upright position 402 on a seat device 106.

Vehicle 100 is facing an imminent collision with a truck 600. Loading sill 602 of truck 600 is located at a dangerous height if underride protection 604 of truck 600 fails to sufficiently protect vehicle 100 in a potential underride situation.

In addition to collisions with wild animals, passenger cars fairly frequently also crash into the rear of trucks. Such crashes may take a similar course as accidents with wild animals. Trucks are equipped with an underride protection 604 at their tail ends 606, which is meant to prevent a vehicle 100 from driving under tail end 606 of truck 600. However, this underride protection 604 frequently is not strong enough. If a vehicle 100 crashes into such a truck 600, then vehicle 100 drives virtually without deceleration under truck 600 until vehicle front 608 of vehicle 100 strikes the rear axle of truck 600, where it is decelerated. Loading sill 602 of truck 600 is often located above engine hood 504 of vehicle 100. When vehicle 100 penetrates tail end 606 of truck 600, loading sill 602 of truck 600 may seriously injure the occupant in front seat 106.

Seat device 106 will usually shift the occupant to an upright position 402 in the event of a collision with a foreign object. In underride situations, however, the head of the occupant would be located in the danger zone. An upright position 402 of the occupant might therefore worsen the accident result in an accident involving a wild animal or an underride situation.

Figure 7:
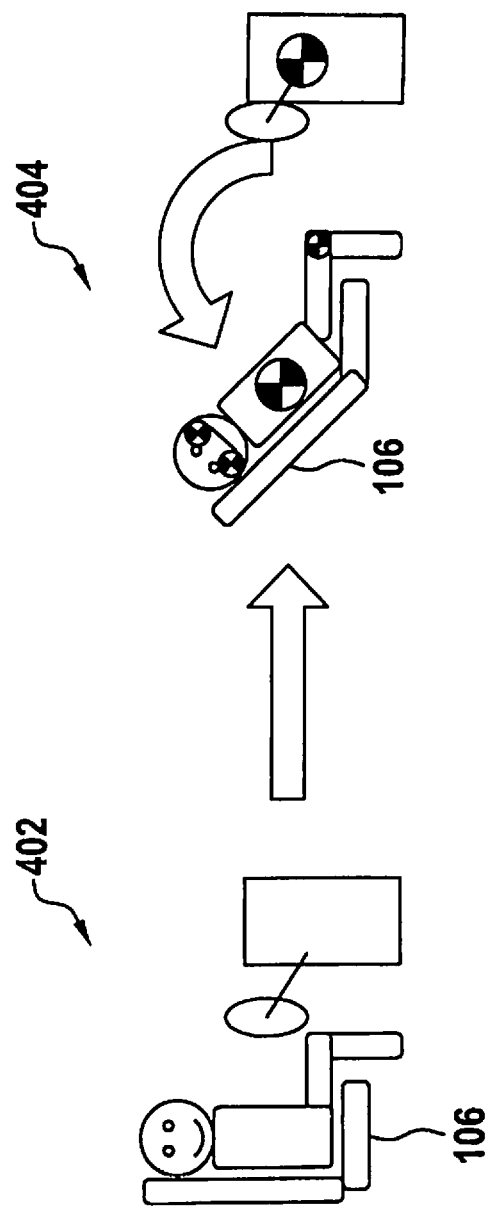
FIG. 7 shows a schematized illustration of a seat device 106 in an upright position and a lying position according to one exemplary embodiment.

FIG. 7 shows a schematized illustration of a seat device 106 in an upright position 402 and in a lying position 404 according to one exemplary embodiment. An occupant of a vehicle is in upright position 402 in the left part of the illustration. In the event of a collision of the vehicle with a foreign object that involves an underride situation, the occupant of the vehicle is moved into a lying position 402 for safety-related reasons according to this specific embodiment.

With the aid of an environment sensor, a critical underride situation with a wild animal or with a truck is indicated even before a collision with a foreign object has occurred. The critical underride situation is able to be mitigated by adjusting a seat device 106 from an upright position 402 to a lying position 404.

An environment sensor such as a video camera detects a looming accident with a wild animal or with a truck. If the occupant is already in a lying position 404, an adjustment of the seating position to an upright position 402 will be prevented. However, if the occupant is in an upright position 402, or in other words, is in a dangerous position, a lying position 404 of seat device 106 will be adjusted. The protection of the occupant against sliding from underneath the belt can then be carried out using an anti-submarining airbag and/or by an activation of a belt pretensioner, for instance. This has the advantage that in an underride situation, lying position 404 better protects the occupant than upright position 402 as a whole.

In one specific embodiment, a risk endangerment determination of one and/or more occupant(s) of the vehicle is carried out. An environment signal is set up to transmit information pertaining to the driving environment of the vehicle to a determination device. The determination device is developed to determine a risk signal and to make the risk signal available to a provisioning device. The risk signal indicates an injury risk of the occupant in a collision in upright position 402 and a second injury risk of the occupant in a collision in lying position 404. The provisioning device is then designed to transmit an adjustment signal to seat device 106 and to make it available if the seating position of the occupant is to be adjusted.

In addition to the risk signal, an overlap signal is set up to indicate information about a possible overlap between the vehicle and the foreign object. An environment signal is set up to transmit information pertaining to a possible overlap between the vehicle and the foreign object to a determination device. The determination device is developed to determine the overlap signal and to make it available to a provisioning device.

For example, in case of an overlap of the vehicle and the foreign object, only seat devices 106 on the side of the vehicle that are at risk are brought into lying position 404. Occupants who are seated on a side of the vehicle that is not at risk are usually better protected in upright position 402 than in lying position 404.

In one further scenario, a penetration depth of the vehicle during the underride situation is also taken into account through the measurement of the risk endangerment. For example, the penetration depth describes the distance between the loading sill of the truck and its rear axle. Here, too, a risk signal is determined and made available to a provisioning device. The risk signal indicates a likely penetration depth of the vehicle. The provisioning device is then designed to forward an adjustment signal to seat device 106 and to make it available in the event that the seating position of the occupant should be adjusted. A rear seat row of the vehicle may remain in upright position 402 given a medium distance or penetration depth. At a low distance, the front seat row of the vehicle, too, may remain in upright position 402. In the case of a deep penetration depth, in particular in a collision with an elk, each passenger is brought into a lying position 704.

In one further specific embodiment, the risk endangerment of each seating position is determined, e.g., from the geometry and position of the foreign object and its future movement and position. Here, too, a risk signal is determined and made available to a provisioning device. The risk signal indicates a likely penetration depth of the vehicle. The provisioning device is then designed to forward an adjustment signal to seat device 106 and to make this adjustment signal available if the seating position of the occupant should be adjusted. This makes it possible to optimally protect the occupant even at an oblique impact angle of the vehicle and foreign object, e.g., during an attempted evasive maneuver. If multiple occupants are located in the vehicle, the particular occupants whose heads are at risk of injury are brought to lying position 404 using one or more adjustment signals.

In one further specific embodiment, the present method is executed from upright position 402 to lying position 404 as a function of the seat occupancy of the vehicle. A seat-occupancy signal indicates a seat occupancy inside the vehicle. Seat device 106 and further seat devices are developed to provide the seat-occupancy signal. A supply unit is designed to receive the seat-occupancy signal and to use it to provide an adjustment signal to seat device 106.

If a further passenger who might be put at risk by the adjustment of seat device 106 is located behind an occupant who is to be brought into lying position 404, lying position 404 will not be adjusted. If a passenger sitting in the rear has sufficient space with respect to the person in front, then the occupant may be considered not to be at risk. If the person behind is also brought into lying position 404, then an endangerment of said person may be ruled out, and the person in front is able to be moved into lying position 404 without hesitation. It is also possible to shift the person in the rear to a position in which the person in front is able to move into lying position 404, using belt pretensioners, for instance. This particularly makes it possible to protect front seat devices 106, which are exposed to a high injury risk in an underride situation, for example.

In a collision of the vehicle with a passenger car, no lying position 404 will be adjusted because the accident situation is usually safer in upright position 402 than in lying position 404. In an underride situation involving a truck or a wild animal, on the other hand, lying position 404 is adjusted.

In one further specific embodiment, lying position 404 will not be adjusted if the vehicle system detects that no means for preventing submarining are available or that they do not offer sufficient protection. In this context, a protection signal is set up to indicate whether seat device 106 is equipped with a restraining device to prevent submarining of the occupant. Seat device 106 and further seat devices are designed to provide the protection signal. A provisioning device is designed to receive the protection signal and to use it to provide an adjustment signal to seat device 106.

This may mean that, depending on the equipment level of the vehicle, lying position 404 will not be implemented in an underride situation if the restraining means are not adequate. In such a case, it seems better to drive into the truck in the hope that the loading sill of the truck will not penetrate too deeply into the interior space of the vehicle. In an accident with a wild animal, on the other hand, a shift to lying position 404 seems appropriate virtually without exception since an accident deceleration is lower in this case than in an underride situation involving a truck, and the occupant slips underneath the belt and into the footwell of the vehicle only on rare occasions.

In one further specific embodiment, the decision as to whether a lying position will be adjusted is made as a function of the belt status of the occupant and whether or not the occupant is strapped in. Here, a belt signal is provided that indicates that the occupant is wearing a seatbelt. Seat device 106 and further seat devices are developed to provide the belt signal. A provisioning device is designed to receive the belt signal and to use it to provide an adjustment signal to seat device 106.

If lying position 404 with submarining is less risky than upright position 402 with a forward displacement and a simultaneous penetration of the foreign object, then lying position 404 will be adjusted.

In one further specific embodiment, the occupant is also brought into a lying position 404 during a manual driving operation in the event of an underride situation. The environment sensor, which is installed for driver-assistance systems, for instance, detects the looming collision. In this context, a control signal is set up to indicate whether the vehicle is under manual or automatic control. A device for the automated control of the vehicle supplies the control signal. A provisioning device is designed to receive the control signal and to use it to provide an adjustment signal to seat device 106. If necessary, the electric seat adjustment rapidly shifts the passenger to the lying position.

In one further, and rather unlikely, specific embodiment, the seat in the vehicle is brought into a lying position 404 by a mechanical release of an anchoring. The release of this anchoring may be triggered pyrotechnically. This makes it possible to shift even seats that are not electrically adjustable or seats that have a slow adjustment to a good position.

Figure 8:
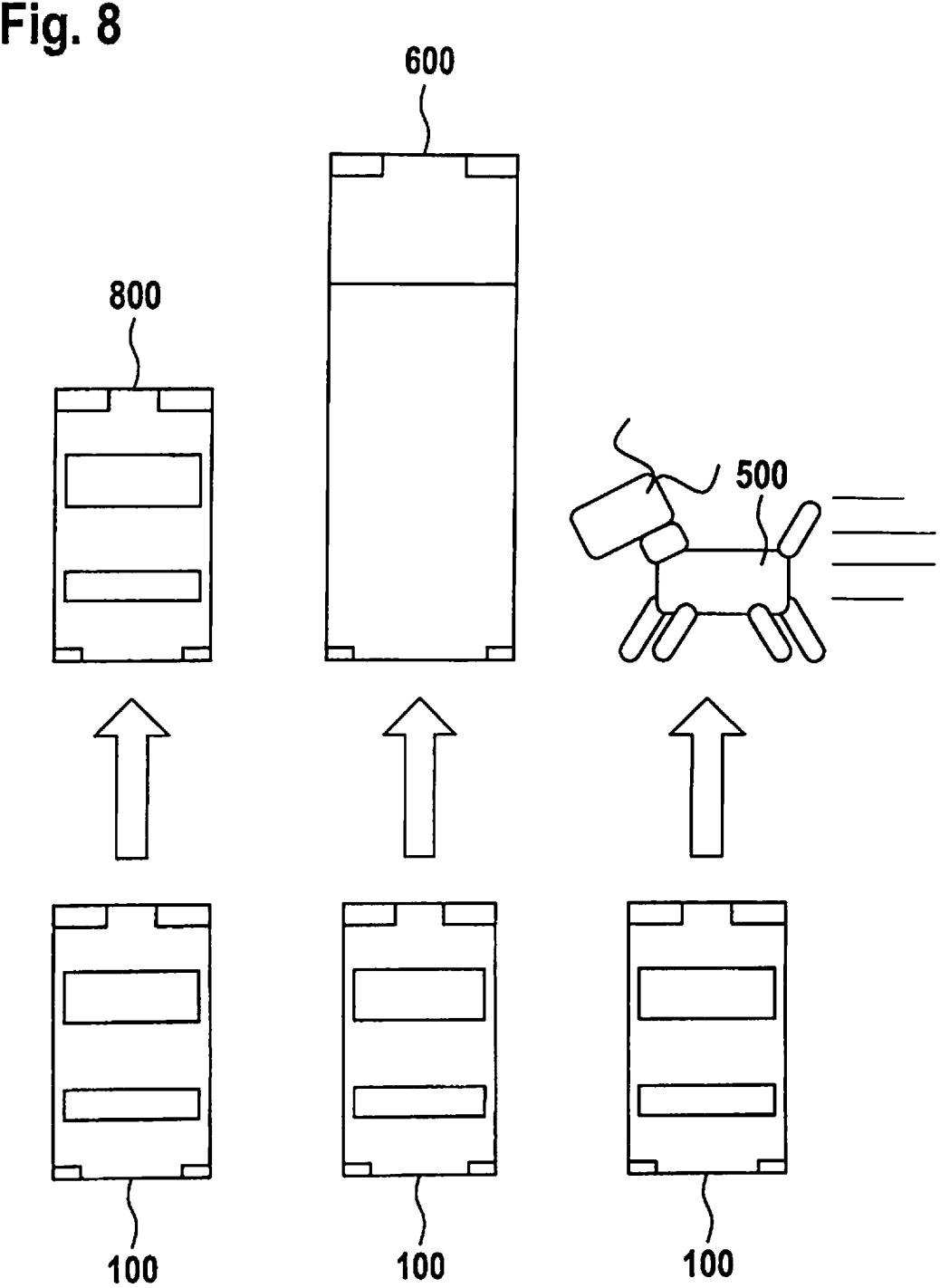
FIG. 8 shows a schematized illustration of a collision between a vehicle and a foreign object according to one exemplary embodiment.

FIG. 8 shows a schematized illustration of a collision between a vehicle 100 and a foreign object 500, 600, 700 according to one specific embodiment. The illustration shows three different foreign objects 500, 600, 700, which are involved in an imminent collision with vehicle 100. The three foreign objects 500, 600, 700 are respectively an elk 500, a truck 600, and a passenger car 700.

In one specific embodiment, the present method is executed as a function of foreign object 500, 600, 700. Here, a foreign-object signal is set up to indicate whether foreign object 500, 600, 700 is a passenger car 700 or some other object, e.g., a truck 600. For instance, an environment signal is set up to transmit information pertaining to foreign object 500, 600, 700 to a determination device, which is developed to determine a type of foreign object 500, 600, 700 and to provide a foreign-object signal that indicates said type to a provisioning device. The adjustment signal is supplied if the foreign-object signal indicates an object 500, 600 that does not involve a passenger car 700. On the other hand, the adjustment signal is not supplied if the foreign-object signal indicates a passenger car 700 as the foreign object.

What is claimed is:

1. A method for adapting a seating position of an occupant of a vehicle in a collision of the vehicle with a foreign object, the method comprising:
   detecting environment data representing an environment of the vehicle;
   determining, based on the detected environment data, an imminent underride situation of the vehicle;
   based on the determining of the imminent underride situation of the vehicle, determining a collision signal indicating the imminent underride situation of the vehicle;
   providing an adjustment signal, which causes a change in the seating position from an upright position to a lying position, to an interface to a seat device of the vehicle using the collision signal that indicates the imminent underride situation of the vehicle, and using a position signal that indicates the seating position of the occupant;
   wherein the providing of the adjustment signal takes place when the position signal indicates the upright position, and the providing of the adjustment signal does not take place when the position signal indicates the lying position.

2. The method as recited in claim 1, wherein in the providing step, the adjustment signal is provided using an overlap signal, which indicates an overlap between the vehicle and the foreign object.

3. The method as recited in claim 1, wherein in the providing step, the adjustment signal is provided using a risk signal that indicates at least one of: (i) a first injury risk for the occupant in a collision in the upright position, and (ii) a second injury risk for the occupant in the collision in the lying position.

4. The method as recited in claim 1, wherein in the providing step, the adjustment signal is provided using a belt signal that indicates whether the occupant is strapped in, and the adjustment signal is provided if the belt signal indicates that the occupant is strapped in.

5. The method as recited in claim 1, further comprising:
   releasing a mechanical anchoring of the seat device using the adjustment signal to change the upright position to the lying position.

6. The method as recited in claim 1, wherein in the providing step, the adjustment signal is provided using a protection signal that indicates whether the seat device has a restraining device at its disposal to prevent submarining of the passenger, and the adjustment signal is provided if the protection signal indicates an availability of the restraining device.

7. The method as recited in claim 1, wherein in the providing step, the adjustment signal is provided using a seat-occupancy signal that indicates a seat occupancy inside the vehicle.

8. A method for adapting a seating position of an occupant of a vehicle in a collision of the vehicle with a foreign object, the method comprising:

providing an adjustment signal, which causes a change in the seating position from an upright position to a lying position, to an interface to a seat device of the vehicle using a collision signal that indicates an imminent underride situation of the vehicle, and using a position signal that indicates the seating position of the occupant;

wherein the providing of the adjustment signal takes place if the position signal indicates the upright position, and the providing of the adjustment signal does not take place if the position signal indicates the lying position;

wherein in the providing step, the adjustment signal is provided using a foreign-object signal that indicates whether the foreign object is a passenger car or some other object, and the adjustment signal is provided if the foreign-object signal indicates the other object, and the adjustment signal is not provided if the foreign-object signal indicates the passenger car as the foreign object.

9. The method as recited in claim 8, further comprising: determining the collision signal using an environment signal received via an interface to an environment sensor of the vehicle.

10. A method for adapting a seating position of an occupant of a vehicle in a collision of the vehicle with a foreign object, the method comprising:

providing an adjustment signal, which causes a change in the seating position from an upright position to a lying position, to an interface to a seat device of the vehicle using a collision signal that indicates an imminent underride situation of the vehicle, and using a position signal that indicates the seating position of the occupant;

wherein the providing of the adjustment signal takes place if the position signal indicates the upright position, and the providing of the adjustment signal does not take place if the position signal indicates the lying position;

wherein in providing step, the adjustment signal is provided using a risk signal that indicates a likely penetration depth of the vehicle.

11. A controller for adapting a seating position of an occupant of a vehicle in a collision of the vehicle with a foreign object, the controller designed to:

provide an adjustment signal, which causes a change in the seating position from an upright position to a lying position, to an interface to a seat device of the vehicle using a collision signal that indicates an imminent underride situation of the vehicle, and using a position signal that indicates the seating position of the occupant;

wherein the providing of the adjustment signal takes place if the position signal indicates the upright position, and the providing of the adjustment signal does not take place if the position signal indicates the lying position;

wherein in the providing, the adjustment signal is provided using a foreign-object signal that indicates whether the foreign object is a passenger car or some other object, and the adjustment signal is provided if the foreign-object signal indicates the other object, and the adjustment signal is not provided if the foreign-object signal indicates the passenger car as the foreign object.

12. A non-transitory machine-readable memory medium on which is stored a computer program for adapting a seating position of an occupant of a vehicle in a collision of the vehicle with a foreign object, the computer program, when executed by a processor, causing the processor to perform:

providing an adjustment signal, which causes a change in the seating position from an upright position to a lying position, to an interface to a seat device of the vehicle using a collision signal that indicates an imminent underride situation of the vehicle, and using a position signal that indicates the seating position of the occupant;

wherein the providing of the adjustment signal takes place if the position signal indicates the upright position, and the providing of the adjustment signal does not take place if the position signal indicates the lying position;

wherein in the providing, the adjustment signal is provided using a foreign-object signal that indicates whether the foreign object is a passenger car or some other object, and the adjustment signal is provided if the foreign-object signal indicates the other object, and the adjustment signal is not provided if the foreign-object signal indicates the passenger car as the foreign object.

* * * * *